United States Patent
Trnčić et al.

(10) Patent No.: US 10,338,799 B1
(45) Date of Patent: Jul. 2, 2019

(54) SYSTEM AND METHOD FOR PROVIDING AN ADAPTIVE SEEK BAR FOR USE WITH AN ELECTRONIC DEVICE

(71) Applicant: SPOTIFY AB, Stockholm (SE)

(72) Inventors: Igor Trnčić, Stockholm (SE); Anton Gravestam, Stockholm (SE)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 15/643,016

(22) Filed: Jul. 6, 2017

(51) Int. Cl.
*G06F 3/0485* (2013.01)
*G06F 3/16* (2006.01)

(52) U.S. Cl.
CPC .......... *G06F 3/04855* (2013.01); *G06F 3/165* (2013.01)

(58) Field of Classification Search
CPC ... G06F 3/04855; G06F 3/165; G06F 3/04847
See application file for complete search history.

(56) References Cited

U.S. PATENT DOCUMENTS

| | | | | |
|---|---|---|---|---|
| 5,485,174 A * | 1/1996 | Henshaw | ............ | G06F 3/0485 345/684 |
| 6,262,724 B1 * | 7/2001 | Crow | ............ | G06F 3/048 715/723 |
| 6,348,936 B1 * | 2/2002 | Berteig | ............ | G06F 3/04855 715/784 |
| 6,507,349 B1 * | 1/2003 | Balassanian | ........ | G06F 3/04812 345/440.1 |
| 6,542,171 B1 * | 4/2003 | Satou | ............ | A43B 24/0003 463/30 |
| 7,765,491 B1 * | 7/2010 | Cotterill | ............ | G06F 3/0485 345/156 |
| 7,793,018 B1 * | 9/2010 | Teng | ............ | G06F 3/0481 710/72 |
| 7,844,901 B1 * | 11/2010 | Joseph | ............ | G11B 27/34 715/723 |
| 8,068,105 B1 * | 11/2011 | Classen | ............ | G06T 11/206 345/440 |

(Continued)

FOREIGN PATENT DOCUMENTS

KR    20110010935    2/2011

OTHER PUBLICATIONS

Extended European Search Report for European Patent Application No. 18182301.4, dated Nov. 2, 2018; 6 pages.

(Continued)

*Primary Examiner* — Amy M Levy
(74) *Attorney, Agent, or Firm* — Tucker Ellis LLP

(57) ABSTRACT

In accordance with an embodiment, described herein is a system and method for providing an adaptive seek bar, for use with a displayed user interface of an electronic device, for example a tablet computer, smartphone, or wearable mobile device, that can be used as a media device for playing of music, video, or other forms of media content. A media application is configured to display a seek bar that is adaptable to the shape of a parent user interface, for example by being displayed along the perimeter of the parent user interface. The adaptive seek bar can be associated with a greater usable length, and occupy less central space than other types of seek bar. User interaction with the seek bar can be used to access or otherwise control the playing of media content that is stored locally at the electronic device, or is streamed from a media server.

20 Claims, 12 Drawing Sheets

(56) References Cited

U.S. PATENT DOCUMENTS

| | | | |
|---|---|---|---|
| 2003/0103079 A1* | 6/2003 | Adatia | G06F 3/0481 715/762 |
| 2004/0027371 A1 | 2/2004 | Jaeger | |
| 2005/0034083 A1* | 2/2005 | Jaeger | G06F 3/04847 715/863 |
| 2005/0091604 A1* | 4/2005 | Davis | G06F 3/0482 715/772 |
| 2007/0189708 A1* | 8/2007 | Lerman | G11B 27/034 715/716 |
| 2008/0080837 A1* | 4/2008 | Mei | G06F 3/04812 386/248 |
| 2008/0165210 A1* | 7/2008 | Platzer | G06F 3/0485 345/672 |
| 2008/0211779 A1* | 9/2008 | Pryor | G01C 21/3664 345/173 |
| 2008/0252597 A1* | 10/2008 | Heynen | G06F 3/04847 345/157 |
| 2009/0199119 A1* | 8/2009 | Park | G06F 3/04847 715/765 |
| 2009/0228828 A1* | 9/2009 | Beatty | G06F 3/0488 715/786 |
| 2010/0156830 A1* | 6/2010 | Homma | G06F 3/04847 345/173 |
| 2010/0185976 A1* | 7/2010 | Sadanandan | G06F 3/04847 715/786 |
| 2010/0231537 A1* | 9/2010 | Pisula | G06F 3/0481 345/173 |
| 2010/0281371 A1* | 11/2010 | Warner | G06F 9/4443 715/720 |
| 2010/0302188 A1* | 12/2010 | Bamford | G06F 3/0482 345/173 |
| 2010/0306022 A1* | 12/2010 | Plut | G06Q 30/02 705/14.54 |
| 2011/0052144 A1* | 3/2011 | Abbas | G11B 27/034 386/240 |
| 2011/0169867 A1* | 7/2011 | Kniffen | G08B 13/194 345/660 |
| 2011/0179382 A1* | 7/2011 | Liu | G06F 3/046 715/786 |
| 2014/0200452 A1* | 7/2014 | Chang | G06F 3/04842 600/437 |
| 2014/0215413 A1* | 7/2014 | Calkins | G06F 3/04883 715/863 |
| 2014/0355961 A1* | 12/2014 | Paulus | G06T 13/80 386/282 |
| 2015/0301691 A1* | 10/2015 | Qin | G11B 27/05 715/772 |
| 2015/0378589 A1* | 12/2015 | Chi | G06F 3/04855 715/786 |
| 2016/0253039 A1* | 9/2016 | Heo | G06F 3/0412 345/173 |
| 2016/0266781 A1* | 9/2016 | Dandu | H04N 21/42204 |
| 2016/0269455 A1* | 9/2016 | Casey | H04L 65/4069 |
| 2016/0357353 A1* | 12/2016 | Miura | G06F 3/0481 |
| 2017/0060520 A1* | 3/2017 | Cohen | G06F 3/165 |
| 2017/0185240 A1* | 6/2017 | Delrosario | G06F 3/04847 |
| 2017/0185260 A1* | 6/2017 | Mardirossian | G06F 3/04812 |

OTHER PUBLICATIONS

Machine translation of Korean Patent Application No. KR 20110010935, as provided by the European Patent Office, in connection with the Extended European Search Report for European Patent Application No. 18182301.4, 8; dated Feb. 8, 2011; 12 pages.

Examination Report issued by the European Patent Office for European Patent Application No. 18182301.4, dated Apr. 2, 2019, 5 pages.

* cited by examiner

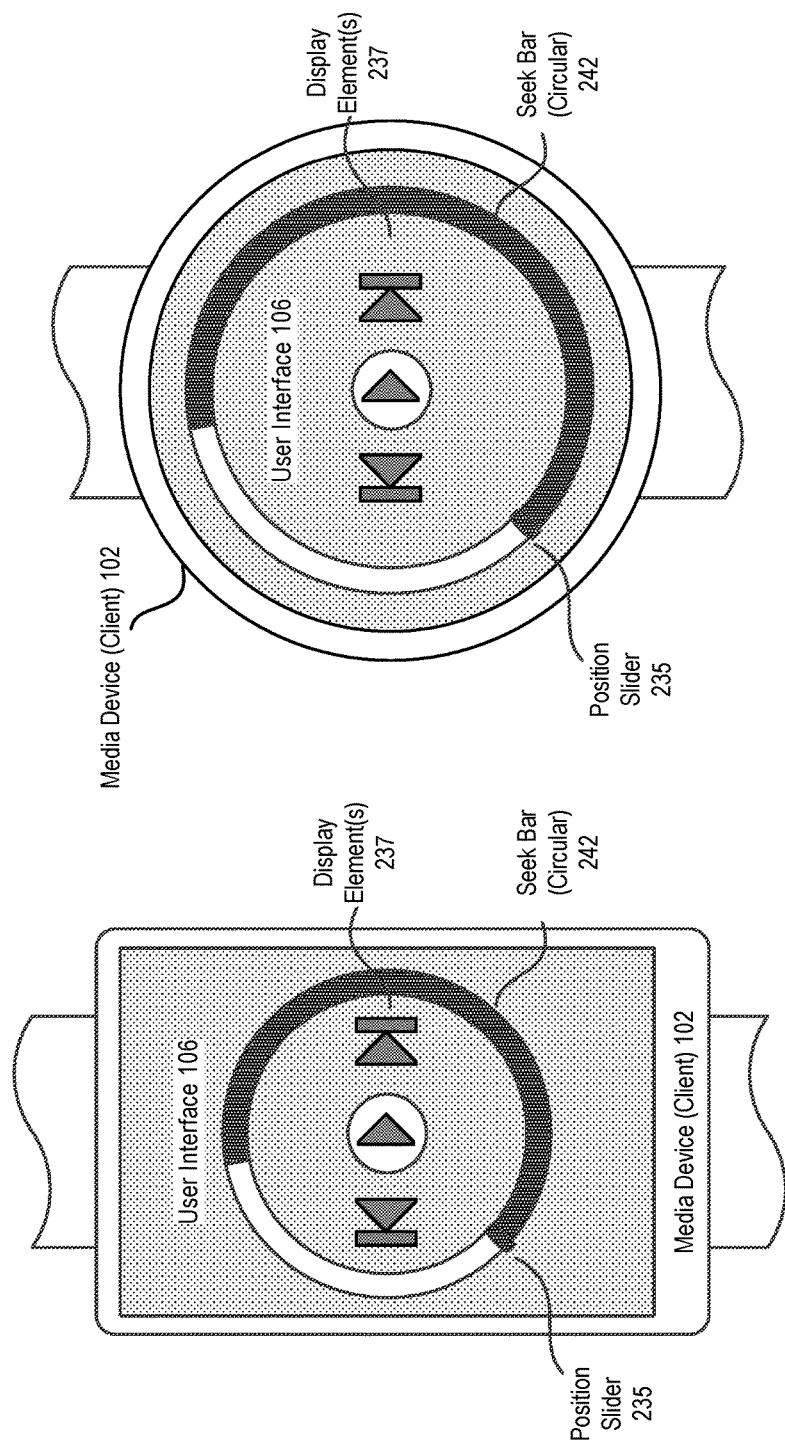

SYSTEM AND METHOD FOR PROVIDING AN ADAPTIVE SEEK BAR FOR USE WITH AN ELECTRONIC DEVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to user interfaces for electronic devices, and are particularly related to an adaptive seek bar for use with an electronic device, for example a wearable mobile device or other media device.

BACKGROUND

Electronic devices, for example tablet computers, smartphones, and wearable mobile devices such as smart watches, can be used as media devices for playing of music, video, or other forms of media content.

Such devices are often equipped with a touch-sensitive display screen provided in one of various shapes and associated with a parent user interface that enables display and selection of various display elements, such as music playback or volume controls. For example, different devices may have one of a square or rectangular, round, or semi-round (having a linear inset portion or "chin") display screen, with correspondingly different shapes of parent user interfaces.

However, while differently-shaped display screens provide users with a variety of consumer options from which to choose, it can be challenging to provide seek bars and other display elements that support the variety of shapes. Additionally, given that the display screens on some wearable (e.g., watch-type) mobile devices are much smaller than those of other media devices, it can be challenging to provide seek bars and other display elements that accommodate the size limitations and usable screen space of their parent user interface.

SUMMARY

In accordance with an embodiment, described herein is a system and method for providing an adaptive seek bar, for use with a displayed user interface of an electronic device, for example a tablet computer, smartphone, or wearable mobile device, that can be used as a media device for playing of music, video, or other forms of media content. A media application is configured to display a seek bar that is adaptable to the shape of a parent user interface, for example by being displayed along the perimeter of the parent user interface. The adaptive seek bar can be associated with a greater usable length, and occupy less central space than other types of seek bar. User interaction with the seek bar can be used to access or otherwise control the playing of media content that is stored locally at the electronic device, or is streamed from a media server.

BRIEF DESCRIPTION OF THE FIGURES

FIG. 3A and FIG. 3B illustrate examples of circular seek bars that can be used with electronic devices and user interfaces.

DETAILED DESCRIPTION

As described above, while electronic devices, used as media devices for playing of music, video, or other forms of media content, offer differently-shaped display screens and provide users with a variety of consumer options from which to choose, it can be challenging to provide seek bars and other display elements that support the variety of shapes, or accommodate the size limitations and usable screen space of their parent user interface.

In accordance with an embodiment, described herein is a system and method for providing an adaptive seek bar, for use with a displayed user interface of an electronic device, for example a tablet computer, smartphone, or wearable mobile device, that can be used as a media device for playing of music, video, or other forms of media content. A media application is configured to display a seek bar that is adaptable to the shape of a parent user interface, for example by being displayed along the perimeter of the parent user interface. The adaptive seek bar can be associated with a greater usable length, and occupy less central space than other types of seek bar. User interaction with the seek bar can be used to access or otherwise control the playing of media content that is stored locally at the electronic device, or is streamed from a media server.

Digital Media Content Environments

Figure 1:
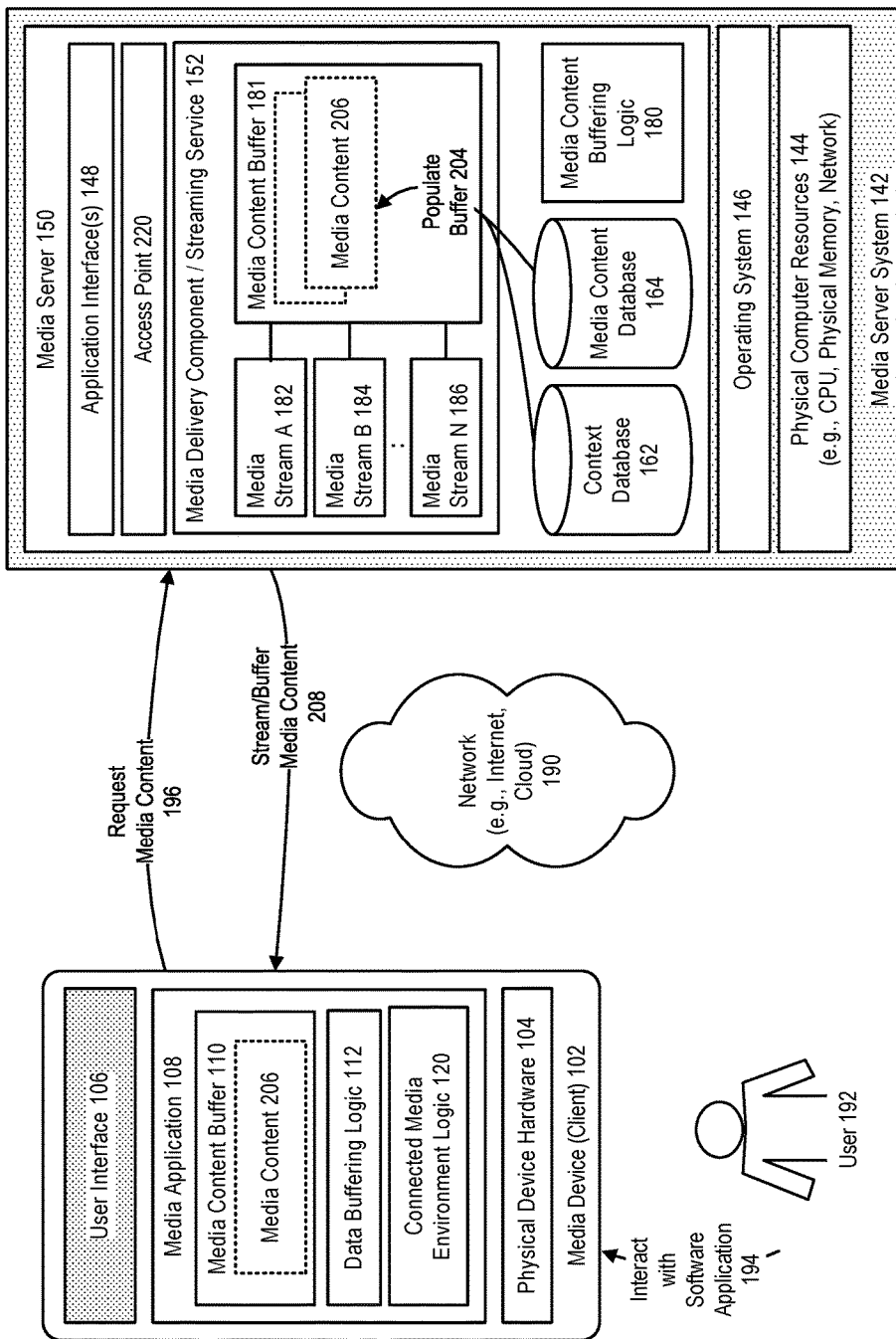
FIG. 1 illustrates an example digital media content environment, in accordance with an embodiment.

FIG. 1 illustrates an example digital media content environment, in accordance with an embodiment.

As illustrated in FIG. 1, in accordance with an embodiment, a media device 102, operating as a client device, can receive and play media content provided by a media server system 142 (media server), or by another system or peer device. In accordance with an embodiment, the media device can be, for example, a personal computer system, handheld entertainment device, tablet device, smartphone, television, audio speaker, in-car entertainment system, or other type of electronic or media device that is adapted or able to prepare a media content for presentation, control the presentation of media content, and/or play or otherwise present media content.

In accordance with an embodiment, each of the media device and the media server can include, respectively, one or more physical device or computer hardware resources 104, 144, such as one or more processors (CPU), physical memory, network components, or other types of hardware resources.

Although, for purposes of illustration, a single client media device and media server are shown, in accordance with an embodiment a media server can support the simultaneous use of a plurality of client media devices. Similarly, in accordance with an embodiment, a client media device can access media content provided by a plurality of media servers, or switch between different media streams produced by one or more media servers.

In accordance with an embodiment, the media device can optionally include a touch-enabled or other type of display screen having a user interface 106, which is adapted to display media options, for example as an array of media tiles, thumbnails, or other format, and to determine a user interaction or input. Selecting a particular media option, for example a particular media tile or thumbnail, can be used as a command by a user and/or the media device, to the media server, to download, stream or otherwise access a corresponding particular media content item or stream of media content.

In accordance with an embodiment, the media device can also include a software media application 108, together with an in-memory client-side media content buffer 110, and a client-side data buffering logic or software component 112, which can be provided as software or program code that is executable by a computer system or other processing device, and which can be used to control the playback of media content received from the media server, for playing either at a requesting media device (i.e., controlling device) or at a controlled media device (i.e., controlled device), in the manner of a remote control.

In accordance with an embodiment, a connected media environment logic or software component 120, which can be provided as software or program code that is executable by a computer system or other processing device, can be provided at the media device, either as part of the media application, or separately, for example as a firmware, to enable the media device to participate within a connected media environment (e.g., a Spotify Connect environment) that enables a user to control the playback of media content at such controlled devices.

In accordance with an embodiment, the client-side data buffering logic, together with the media content buffer, enables a portion of media content items, or samples thereof, to be pre-buffered at a client media device. For example, while media options are being prepared for display on a user interface, e.g., as media tiles or thumbnails, their related media content can be pre-buffered at the same time, and cached by one or more media devices in their media content buffers, for prompt and efficient playback when required.

In accordance with an embodiment, the media server can include an operating system 146 or other processing environment which supports execution of a media server 150 that can be used, for example, to stream music, video, or other forms of media content to a client media device, or to a controlled device.

In accordance with an embodiment, the media server can provide a subscription-based media streaming service, for which a client media device or user can have an associated account and credentials, and which enable the user's media device to communicate with and receive content from the media server. A received media-access request from a client media device can include information such as, for example, a network address, which identifies a destination media device to which the media server should stream or otherwise provide media content, in response to processing the media-access request.

For example, a user may own several media devices, such as a smartphone and an audio speaker, which can play media content received from a media server. In accordance with an embodiment, identifying information provided with a media-access request can include an identifier, such as an IP address, MAC address, or device name, which identifies that the media-access request is intended for use with a particular destination device. This allows a user, for example, to use their smartphone as a controlling device, and their audio speaker as a controlled device to which media content should be sent. The media server can then send the requested media and/or forward the media-access request to the audio speaker, even though the request originated at the user's smartphone.

In accordance with an embodiment, one or more application interface(s) 148 can receive requests from client media devices, or from other systems, to retrieve media content from the media server. A context database 162 can store data associated with the presentation of media content by a client media device, including, for example, a current position within a media stream that is being presented by the media device, or a playlist associated with the media stream, or one or more previously-indicated user playback preferences. The media server can transmit context information associated with a media stream to a media device that is presenting that stream, so that the context information can be used by the device, and/or displayed to the user. The context database can be used to store a media device's current media state at the media server, and synchronize that state between devices, in a cloud-like manner. Alternatively, media state can be shared in a peer-to-peer manner, wherein each device is aware of its own current media state which is then synchronized with other devices as needed.

For example, in accordance with an embodiment, when the destination media device to which the media content is being streamed changes, say from a controlling device to a controlled device, or from a first controlled device to a second controlled device, then the media server can transmit context information associated with an active media content to the newly-appointed destination device, for use by that device in playing the media content.

In accordance with an embodiment, a media content database 164 can include media content, for example music, songs, videos, movies, or other media content, together with metadata describing that media content. The metadata can be used to enable users and client media devices to search within repositories of media content, to locate particular media content items.

In accordance with an embodiment, a server-side media content buffering logic or software component 180, which can be provided as software or program code that is executable by a computer system or other processing device, can be used to retrieve or otherwise access media content items, in response to requests from client media devices or other systems, and to populate a server-side media content buffer 181, at a media delivery component or streaming service 152, which can be similarly provided as software or program code that is executable by a computer system or other processing device, with streams 182, 184, 186 of corresponding media content data, which can then be returned to the requesting device or to a controlled device.

In accordance with an embodiment, a plurality of client media devices, media server systems, and/or controlled devices, can communicate with one another using a network, for example the Internet 190, a local area network, peer-to-peer connection, wireless or cellular network, or other form of network. For example, a user 192 can interact 194 with the user interface at a client media device, and issue requests to access media content, for example the playing of a selected music or video item at their device, or at a controlled device, or the streaming of a media channel or video stream to their device, or to a controlled device.

In accordance with an embodiment, the user's selection of a particular media option can be communicated 196 to the media server, via the server's application interface. The media server can populate its server-side media content buffer at the server 204, with corresponding media content, 206 including one or more streams of media content data, and can then communicate 208 the selected media content to the user's media device, or to a controlled device as appropriate, where it can be buffered in a client-side media content buffer for playing at the device.

In accordance with an embodiment, and as further described below, the system can include a server-side media gateway or access point 220, provided as software or program code that is executable by a computer system or other processing device, or other process or component, which operates as a load balancer in providing access to one or more servers, for use in processing requests at those servers. The system can enable communication between a client media device and a server, via an access point at the server, and optionally the use of one or more routers, to allow requests from the client media device to be processed either at that server and/or at other servers.

For example, in a Spotify media content environment, Spotify clients operating on media devices can connect to various Spotify back-end processes via a Spotify "access-point", which forwards client requests to other servers, such as sending one or more metadataproxy requests to one of several metadataproxy machines, on behalf of the client or end user.

Seek Bars

As described above, electronic devices, for example tablet computers, smartphones, and wearable mobile devices such as smart watches, that are used as media devices for playing of music, video, or other forms of media content, are often equipped with a touch-sensitive display screen provided in one of various shapes and associated with a parent user interface that enables display and selection of various display elements, such as music playback or volume controls.

Figures 2A, 2B:
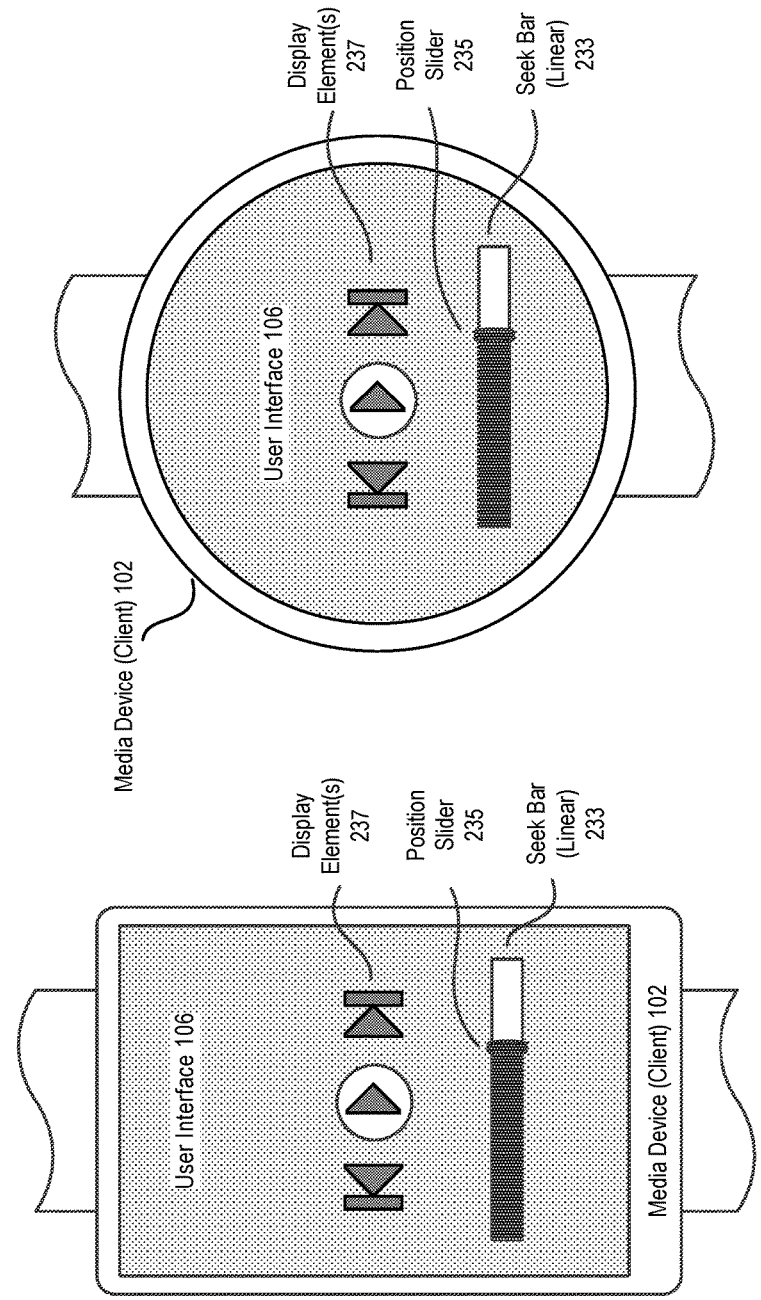
FIG. 2A and FIG. 2B illustrate examples of horizontal seek bars that can be used with electronic devices and user interfaces.

FIG. 2A and FIG. 2B illustrate examples of horizontal seek bars that can be used with electronic devices and user interfaces.

As illustrated in FIGS. 2A and 2B, a media device having a square or rectangular display screen or round display screen can display, as appropriate, a square or rectangular user interface or a round user interface, generally referred to herein as a parent user interface. The parent user interface is adapted to display indications of media options and/or to display, in this example, a linear seek bar 233 having a position slider 235, and one or more other display element(s) such as a media playback control, and to determine a user interaction or input to control the playing of particular media options.

In accordance with an embodiment, a detected user interaction with the seek bar or display element(s) can be interpreted by the media device as a command to control or interact with a particular media content item or stream of media content.

For example, as illustrated in FIG. 2A, the horizontal seek bar can be displayed within the parent user interface, wherein the length of the seek bar can correspond to a playable duration of a particular media content item or stream of media content. The position slider can display a movable indicator that indicates a current playback position/location within the particular media content item or stream of media content. The position slider can be moved, for example by a user dragging their finger or a stylus on the position slider. When the position slider is moved from a first position (start position) on the seek bar, to a second position (end position) on the seek bar, and released, the playback position/location of the particular media content item or stream of media content is adjusted correspondingly, from a first playback position/location to a second playback position/location.

However, a horizontal seek bar is constrained by the width of the display screen, which may be too short to enable a positive user experience. For example, a user might encounter difficulty in moving the position slider from one position on the seek bar to another position, due to the limited space for movement. Additionally, the location of the seek bar may be constrained by, or interfere with, the location of other display elements.

FIG. 3A and FIG. 3B illustrate examples of circular seek bars that can be used with electronic devices and user interfaces, which offer an alternative to the use of horizontal seek bars.

As illustrated in FIGS. 3A and 3B, a media device having a square or rectangular display screen or round display screen can alternatively display, as appropriate, a square or rectangular or round user parent user interface adapted to display a circular seek bar 242, which operates similar to the linear seek bar described previously, except having a circular shape.

However, a circular seek bar is similarly constrained by the width of the display screen, which may be too short to enable a positive user experience; and its location may similarly be constrained by, or interfere with, the location of other display elements.

Adaptive Seek Bars

As described above, while electronic devices, used as media devices for playing of music, video, or other forms of media content, offer differently-shaped display screens and provide users with a variety of consumer options from which to choose, it can be challenging to provide seek bars and other display elements that support the variety of shapes, or accommodate the size limitations and usable screen space of their parent user interface.

In accordance with an embodiment, described herein is a system and method for providing an adaptive seek bar, for use with a displayed user interface of an electronic device, for example a tablet computer, smartphone, or wearable mobile device, that can be used as a media device for playing of music, video, or other forms of media content. A media application is configured to display a seek bar that is adaptable to the shape of a parent user interface, for example by being displayed along the perimeter of the parent user interface. The adaptive seek bar can be associated with a greater usable length, and occupy less central space than other types of seek bar. User interaction with the seek bar can be used to access or otherwise control the playing of media content that is stored locally at the electronic device, or is streamed from a media server.

In accordance with an embodiment, the adaptive seek bar operates as a "smart" user interface element, that is adaptable to the shape of a parent user interface. For example, the seek bar can be made to adapt to its parent user interface by following the perimeter (e.g., curvature) of the parent user interface; which results in the seek bar having an increased usable length and reduced interference with other display elements, and generally provides an improved user experience.

Figure 4:
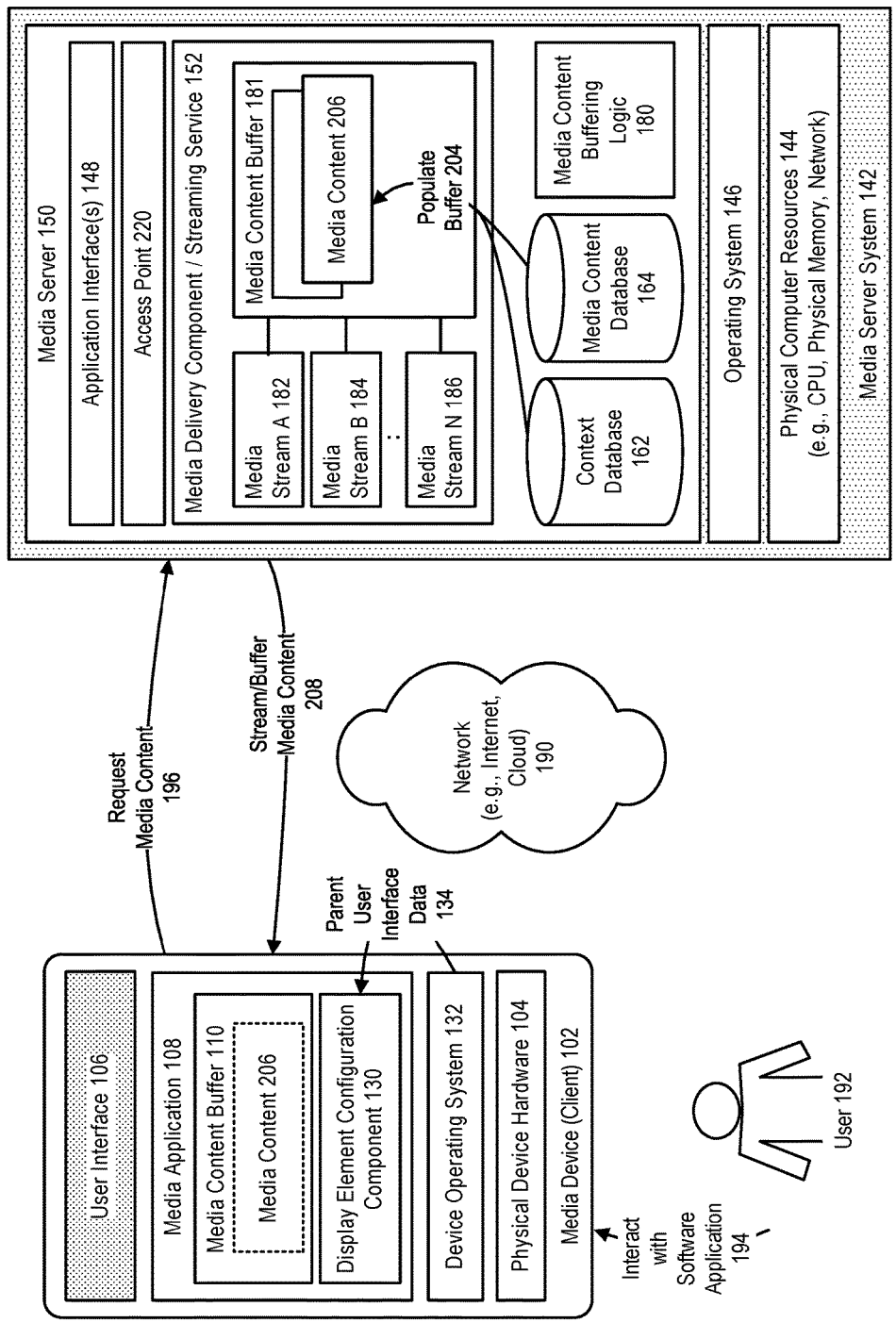
FIG. 4 illustrates an example system that enables use of an adaptive seek bar with a digital media content environment, in accordance with an embodiment.

FIG. 4 illustrates an example system that enables use of an adaptive seek bar with a digital media content environment, in accordance with an embodiment.

As illustrated in FIG. 4, in accordance with an embodiment, a display element configuration component 130 can be provided as part of the media application on the media device. The display element configuration component is adapted to configure a display element such as an adaptive seek bar, and to display the configured seek bar or other display elements at the user interface of the media device.

In accordance with an embodiment, the display element configuration component receives, from the device operating system 132 of the media device, a parent user interface data 134 that indicates one or both of a shape and dimensions of the parent user interface.

In accordance with an embodiment, the display element configuration component uses the parent user interface data to determine a shape and dimensions of the parent user interface. For example, the received parent user interface data can indicate that the parent user interface has a square or rectangular shape, a round shape, or a semi-round shape having a linear inset portion or "chin".

The parent user interface data can also include dimensions of the parent user interface. For example, the parent user interface data can provide a height and width of the parent user interface, or other data corresponding to the dimensions of the parent user interface.

In accordance with an embodiment, the dimensions of the parent user interface can be expressed in pixels, or another measure of dimensions.

In accordance with an embodiment, the display element configuration component can generate a seek bar based on the shape and dimensions of the parent user interface as indicated by the parent user interface data, and a desired thickness of the seek bar. For example, a seek bar can be generated to have a thickness of 1 pixel or more, or another thickness that enables manipulation of the seek bar by a user.

In accordance with an embodiment, the display element configuration component can determine a starting point of the seek bar at the user interface. For example, a starting point of the seek bar can be located at a top-center point of the user interface, or at another location on or near the perimeter of the user interface.

In accordance with an embodiment, the display element configuration component can also determine an ending point of the seek bar. Various factors can influence determination of an ending point. For example, the ending point can simply be determined based on a total length of the seek bar. As another example, the length of the seek bar can be calculated to be a proportion of the total perimeter (e.g., circumference) of the parent user interface. As another example, the length of the seek bar can extend along the entire perimeter of the parent user interface, such that the location of the ending point is at or near the location of the starting point. As another example, the ending point can be selected based on a determination of available screen space accounting for other display elements.

In accordance with an embodiment, once a starting point, and optionally an ending point, have been determined, a seek bar can be generated and displayed along the perimeter (e.g., curvature) of the parent user interface, beginning at the starting point and terminating at the ending point.

In accordance with an embodiment, sections of the seek bar can be generated in accordance with the determined starting point and the length. For example, a first section of the seek bar can be generated and displayed such that it originates from the determined starting point. A terminal (or final) section of the seek bar can be generated and displayed such that it terminates at the ending point. Additionally, the seek bar can be generated such that the total length of the seek bar is apportioned among the sections in accordance with the dimensions of corresponding elements of the parent user interface.

Figure 5:
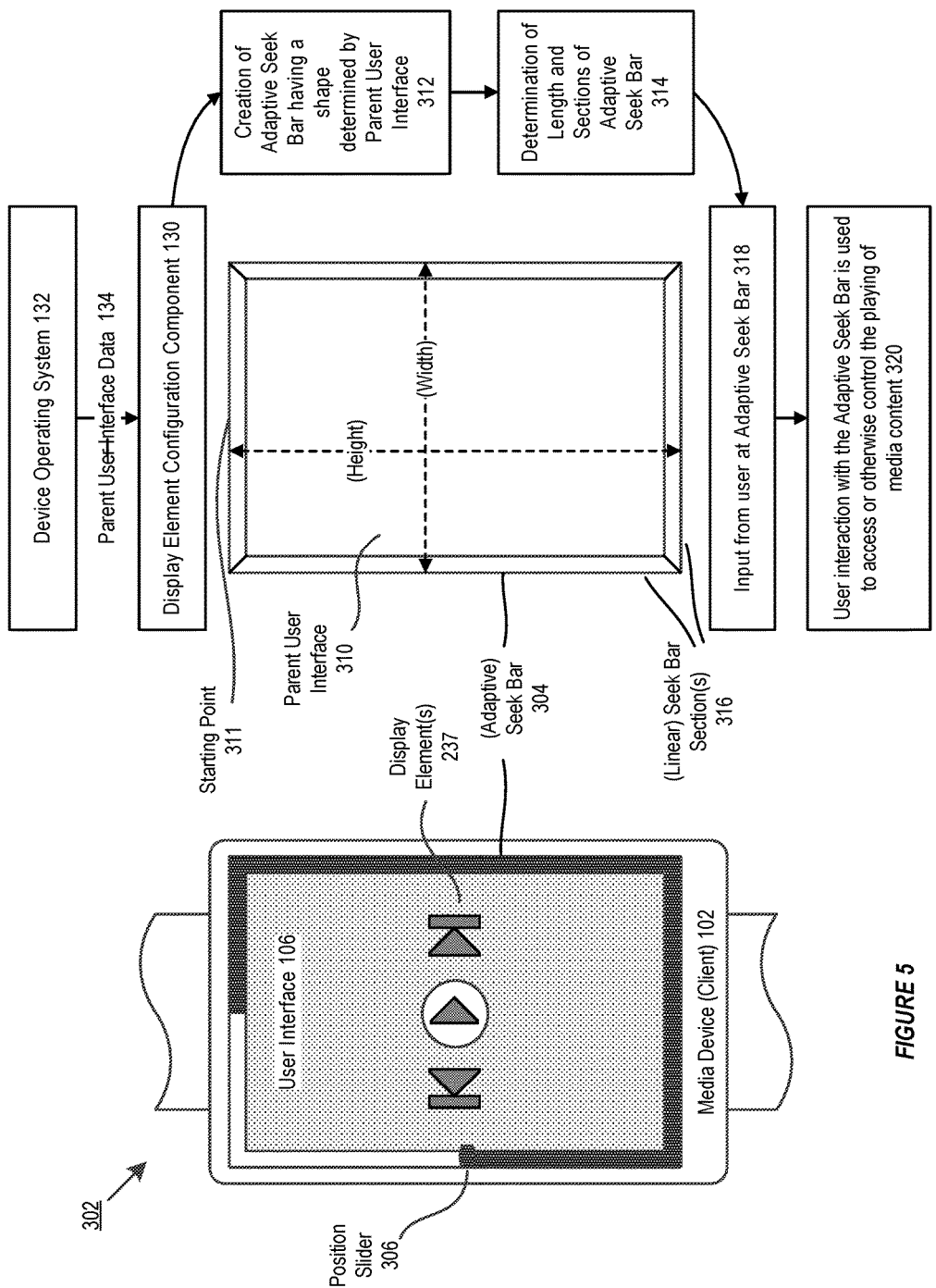
FIG. 5 illustrates an adaptive seek bar, for use with an electronic device having a square or rectangular user interface, in accordance with an embodiment.

FIG. 5 illustrates an adaptive seek bar, for use with an electronic device having a square or rectangular user interface, in accordance with an embodiment.

In accordance with an embodiment 302, a display element configuration component of the media device can generate an adaptive seek bar 304 for display at the user interface, together with a position slider 306.

For example, in accordance with an embodiment, the display element configuration component of the media device can receive a parent user interface data from the operating system of the media device indicative that the parent user interface 310 has a rectangular shape, a height of 390 pixels, and a width of 312 pixels. The displayed thickness of the seek bar for the media device can be configured with a thickness to enable interaction with the seek bar, such as a thickness of 5 pixels, and the starting point 311 can be at the top center of the user interface.

In accordance with an embodiment, at operation 312, the display element configuration component can create a rectangular-shaped seek bar having a shape determined by the parent user interface, corresponding to the rectangular shape of the parent user interface, including at operation 314, determination of length and, in this example, linear seek bar sections 316 of the adaptive seek bar. In accordance with an embodiment, the plurality of sections correspond to the sides (edges) of a rectangle.

In accordance with an embodiment, the display element configuration component generates a first section of the seek bar, which originates at the starting point. For example, where the starting point is at a midpoint along the top side of the parent user interface, the first section of the seek bar has a length corresponding to half of the width of the parent user interface (e.g., 156 pixels), and a location corresponding to the top side of the parent user interface.

In accordance with an embodiment, the display element configuration component can also generate a second section of the seek bar. In this example, the second section of the seek bar has a length corresponding to the height of the parent user interface (e.g., 390 pixels), and a location corresponding to the right-most side of the parent user interface.

In accordance with an embodiment, the display element configuration component can also generate a third section of the seek bar. In this example, the third section of the seek bar has a length corresponding to the width of the parent user interface (e.g., 312 pixels), and a location corresponding to the bottom side of the parent user interface.

In accordance with an embodiment, the display element configuration component can also generate a fourth section of the seek bar. In this example, the ending point is located along the left-most side of the parent user interface, and the fourth section of the seek bar has a length corresponding to a distance between the bottom side and the ending point, and a location corresponding to the left-most side of the parent user interface.

Accordingly, in accordance with an embodiment, the plurality of sections that comprise the composite seek bar can be displayed together as a display element, such that the seek bar appears to follow the perimeter of the square or rectangular screen or user interface in a contiguous manner, wherein the length of the seek bar follows the curvature of the square or rectangular screen or user interface.

In accordance with an embodiment, at operation 318, the seek bar can receive input from a user for moving the position slider along the plurality of sections of the seek bar.

In accordance with an embodiment, at operation 320, a user interaction with the adaptive seek bar is used to access or otherwise control the playing of media content.

Figure 6:
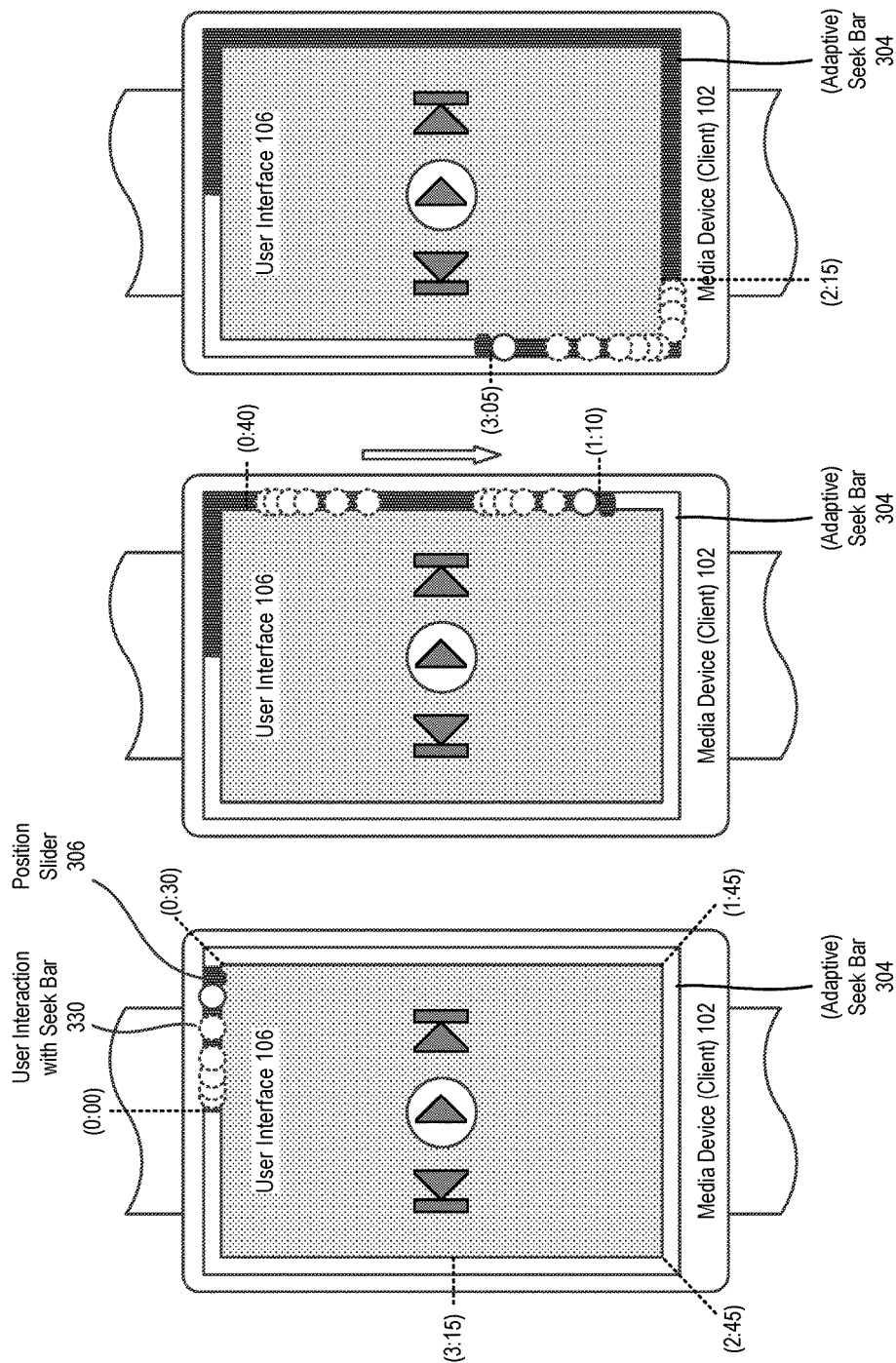
FIG. 6A, FIG. 6B, and FIG. 6C illustrate the use of an adaptive seek bar with an electronic device having a square or rectangular user interface, in accordance with an embodiment.

FIG. 6A, FIG. 6B, and FIG. 6C illustrate the use of an adaptive seek bar with an electronic device having a square or rectangular user interface, in accordance with an embodiment.

As illustrated in FIG. 6A, in accordance with an embodiment, the total length of the seek bar can correspond to a duration (e.g., a total duration) of a particular media content item streamed from a media server, and a position of the position slider/movable indicator on the seek bar corresponds to a current position within the particular media content item.

In accordance with an embodiment, when the seek bar is associated with (or represents) a particular media content item, each section of the seek bar can represent a proportional time period within the particular media content item. For example, as described in the example above, where the parent user interface has a rectangular shape, a height of 390 pixels, and a width of 312 pixels, the first section can have a length of 156 pixels, the second section can have a length of 390 pixels, the third section can have a length of 312 pixels, and the fourth section can have a length of 156 pixels (e.g., 40% of the total length of the left-most side).

For example, in accordance with an embodiment, where a particular media content item is 3 minutes and 15 seconds long, the total length of the seek bar can be chosen to represent a duration of 3 minutes and 15 seconds. In such an example, the first section can represent the first 0.5 minutes of the media content item (e.g., between the 0:00 and 0:30 minute marks), the second section represent the next 1.25 minutes of the media content item (e.g., between the 0:30 and 1:45 minute marks), the third section represent the next minute of the media content item (e.g., between the 1:45 and 2:45 minute marks), and the fourth section represent the remaining 0.5 minutes of the media content item (e.g., between the 2:45 and 3:15 minute marks).

In accordance with an embodiment, the plurality of sections that comprise the composite seek bar can be displayed together, such that the seek bar appears to follow the perimeter of the rectangular screen in a contiguous manner. In response to a user interaction with the seek bar 330 at the user interface indicative of scrolling within one section of the plurality of sections of the seek bar, or across different sections of the plurality of sections of the seek bar, the media device determines (or identifies) one or more sections of the plurality of sections corresponding to the user input.

For example, in accordance with an embodiment, the plurality of sections of the seek bar can be associated with respective portions of a particular media content item as described above. The display element configuration component can detect a user input that indicates a movement of the position slider/movable indicator along the right-most side of the user interface. The display element configuration component can determine that the user input corresponds to a movement from a position within the second section to another position within the same section.

In accordance with an embodiment, the display element configuration component can determine which portion of the associated media content item corresponds to the second section. For example, as illustrated in FIG. 6B, the display element configuration component can determine that the second section represents a portion of the particular media content item between the 0:30 and 1:45 minute marks. The display element configuration component can also determine that the user input indicates a movement from the current playback position at the 0:40 minute mark, to an adjusted playback position at the 1:10 minute mark, within the represented portion. In response, the media device can adjust a playback position within the particular media content item from the 0:40 minute mark to the 1:10 minute mark.

In accordance with an embodiment, a user input can also indicate a movement of the position slider/movable indicator across different sections of the seek bar.

For example, in accordance with an embodiment, as illustrated in FIG. 6C, plurality of sections of the seek bar can be associated with respective portions of a particular media content item as described above. The display element configuration component can detect a user input that indicates a movement of the position slider/movable indicator along the seek bar, from bottom side to the left-most side of the user interface. The display element configuration component can determine that the user input corresponds to a movement from a position within the third section to another position within the fourth section.

In accordance with an embodiment, the display element configuration component can determine which portions of the associated media content item respectively correspond to the third section and the fourth section. For example, the display element configuration component can determine that the third section represents a portion of the particular media content item between the 1:45 and 2:45 minute marks and that the fourth section represents a portion of the particular media content item between the 2:45 and 3:15 minute marks. The display element configuration component can also determine that the user input indicates a movement from the current playback position at the 2:15 minute mark, to an adjusted playback position at the 3:05 minute mark, across the represented portions. In response, the media device can adjust a playback position within the particular media content item from the 2:15 minute mark to the 3:05 minute mark.

In accordance with an embodiment, once the one or more sections corresponding to the user input have been determined, a playback position within the particular media content item can be adjusted (or updated) accordingly.

In accordance with an embodiment, the media device can thus provide an adaptive seek bar as a display element at the user interface, wherein the seek bar follows the perimeter of the square or rectangular display screen. A user can interact with the seek bar at the user interface, so that the user interaction with the seek bar can be used to access or otherwise control the playing of media content that is stored locally at the electronic device, or is streamed from a media server.

Figure 7:
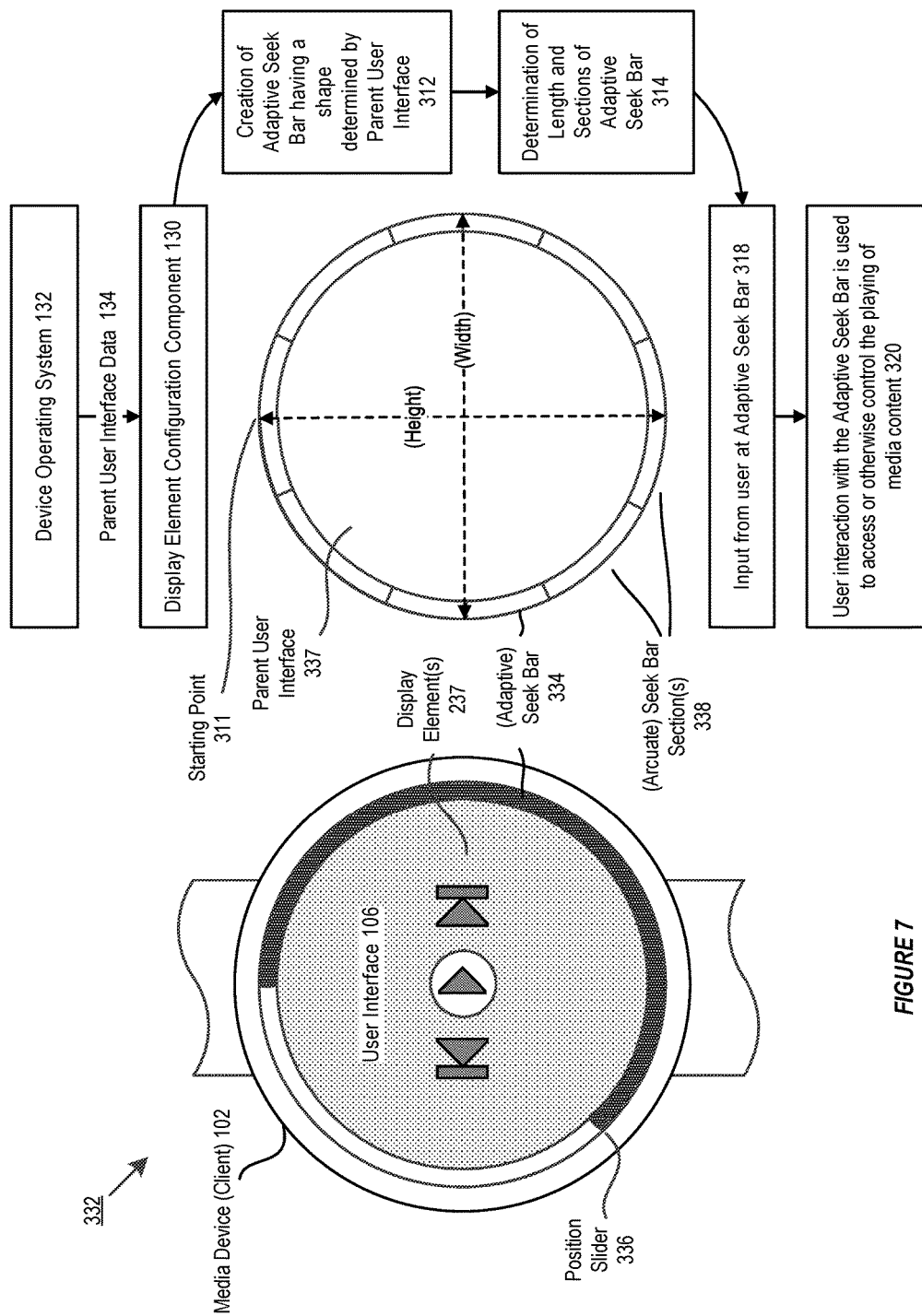
FIG. 7 illustrates an adaptive seek bar, for use with an electronic device having a round user interface, in accordance with an embodiment.

FIG. 7 illustrates an adaptive seek bar, for use with an electronic device having a round user interface, in accordance with an embodiment.

In accordance with an embodiment 332, a display element configuration component of the media device can generate an adaptive seek bar 334 for display at the user interface, together with a position slider 336, wherein the parent user interface, and adaptive seek bar, have a round shape, including, in this example, one or more arcuate seek bar sections 338.

For example, in accordance with an embodiment, the parent user interface data can indicate that the parent user interface has a round shape, a height of 350 pixels, and a width of 350 pixels. The displayed thickness of the seek bar for the media device can be configured with a thickness to enable interaction with the seek bar, such as a thickness of 5 pixels, and the starting point 311 can be at the top center of the user interface.

In accordance with an embodiment, the display element configuration component can generate a round-shaped seek bar corresponding to the round shape of the parent user interface.

In accordance with an embodiment, the display element configuration component can generate the seek bar to have a particular arc length determined by a distance between the starting point and an ending point of the seek bar. For example, the display element configuration component can utilize the parent user interface data received from the device operating system, such as the height and width of the parent user interface, to determine a radius of the parent user interface, and a corresponding central angle between the starting point and the ending point. An arc length of the parent user interface between the starting point and the ending point can then be calculated, and a seek bar having the corresponding arc length can be generated for display at the user interface.

In accordance with an embodiment, the display element configuration component can generate the seek bar to have a particular arc length based on a particular proportion of the total circumference of the parent user interface. For example, the display element configuration component can use the parent user interface data received from the device operating system, such as the height and width of the parent user interface, to calculate a radius and a total circumference of the parent user interface.

In accordance with an embodiment, a seek bar having a length that is a percentage (e.g., 75%) of the total circumference can be generated.

Accordingly, in accordance with an embodiment, the one or more sections that comprise the composite seek bar can be displayed together as a display element, such that the seek bar appears to follow the perimeter of the round screen or user interface in a contiguous manner, wherein the length of the seek bar follows the curvature of the round screen or user interface.

Figure 8:
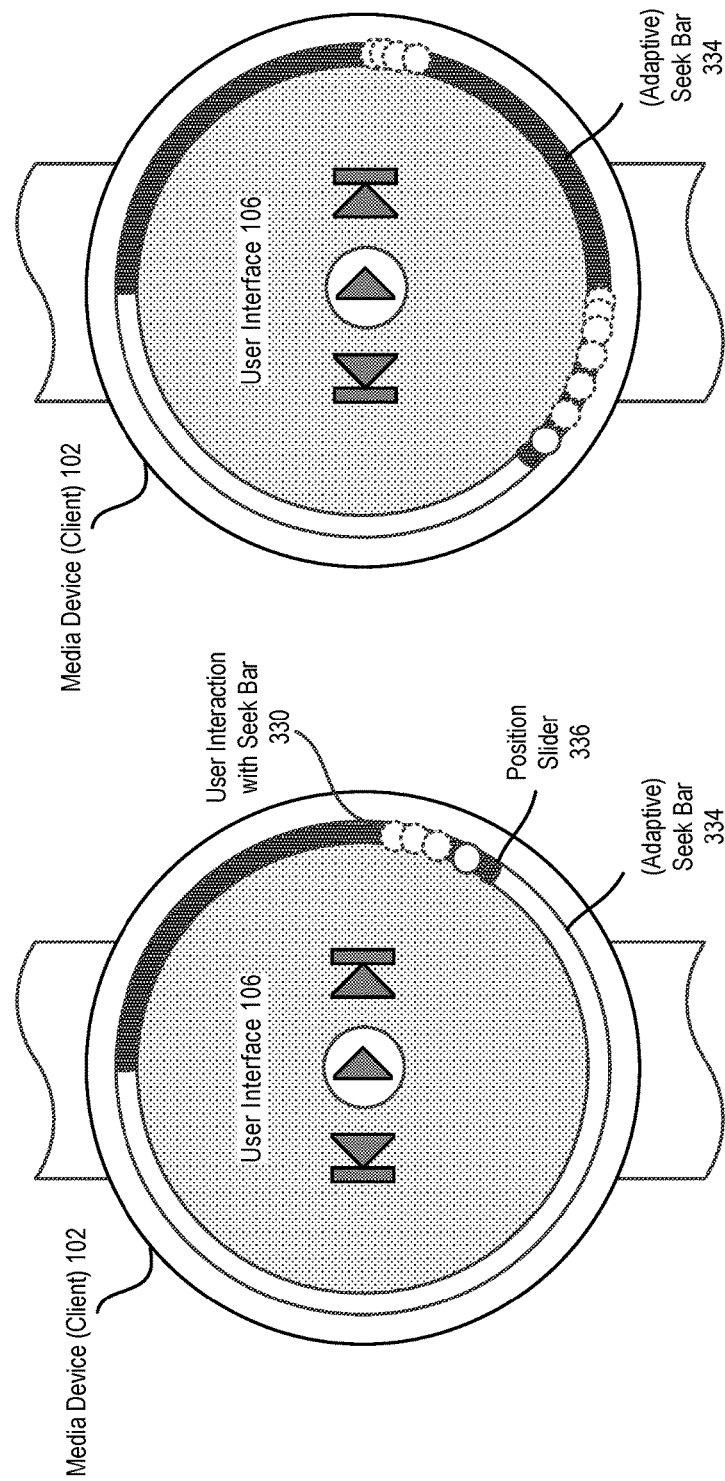
FIG. 8A and FIG. 8B illustrate the use of an adaptive seek bar with an electronic device having a round user interface, in accordance with an embodiment.

FIG. 8A and FIG. 8B illustrate the use of an adaptive seek bar with an electronic device having a round user interface, in accordance with an embodiment. As illustrated in FIGS. 8A and 8B, a user can interact with the seek bar at the user interface, so that the user interaction with the seek bar can be used to access or otherwise control the playing of media content that is stored locally at the electronic device, or is streamed from a media server.

Figure 9:
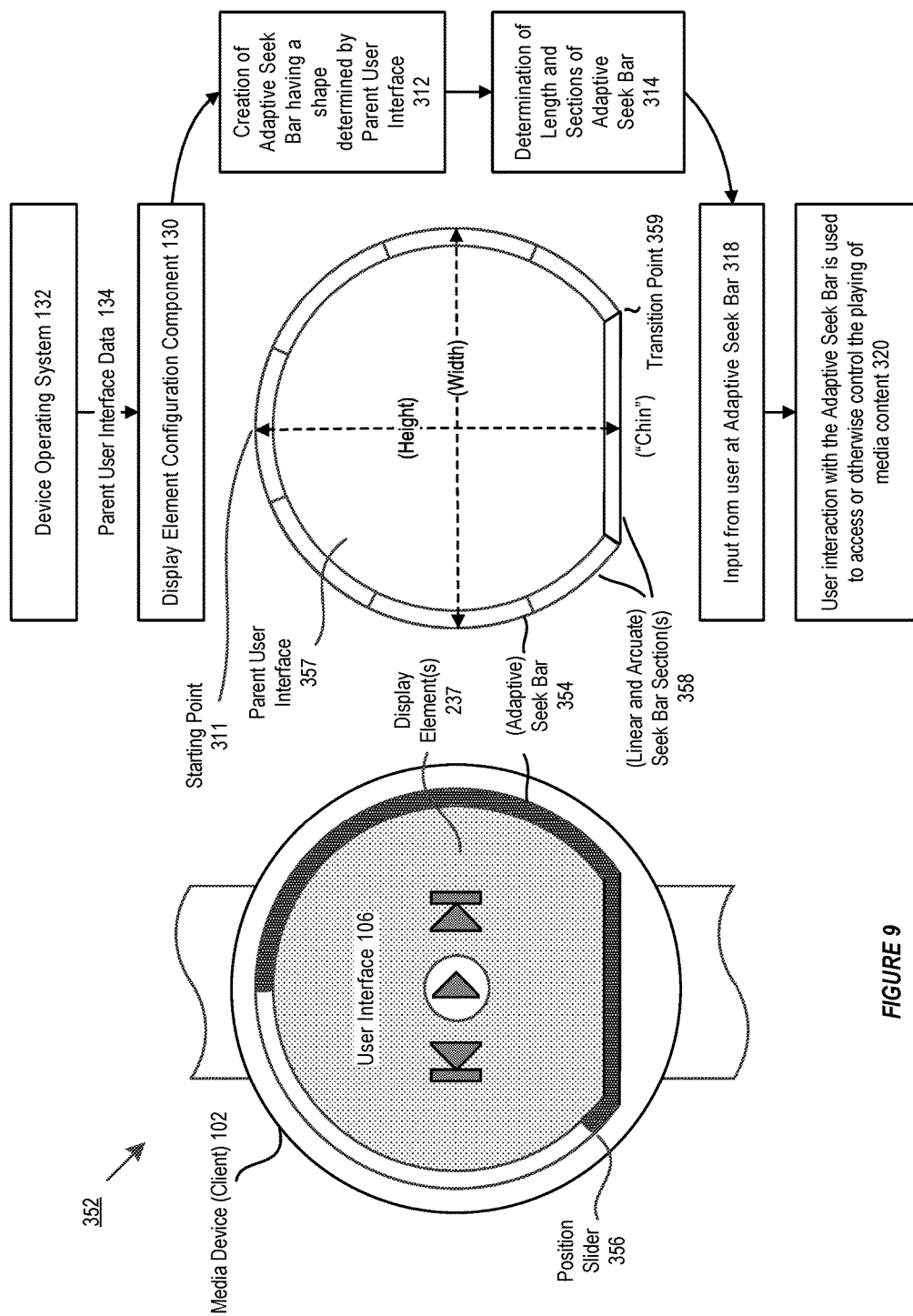
FIG. 9 illustrates an adaptive seek bar, for use with an electronic device having a semi-round user interface, in accordance with an embodiment.

FIG. 9 illustrates an adaptive seek bar, for use with an electronic device having a semi-round user interface, in accordance with an embodiment.

In accordance with an embodiment 352, a display element configuration component of the media device can generate an adaptive seek bar 354 for display at the user interface, together with a position slider 356, wherein the parent user interface, and adaptive seek bar, have a semi-round shape, including, in this example, a combination of linear and arcuate seek bar sections 358.

In accordance with an embodiment, a display element configuration component of the media device can generate an adaptive seek bar for display at the user interface. As an example, in accordance with an embodiment, the display element configuration component of the media device can receive parent user interface data from the operating system of the media device. The parent user interface data can indicate that the parent user interface has a round shape with a linear inset portion or chin, a height of 300 pixels, a chin height of 50 pixels, and a width of 350 pixels. The displayed thickness of the seek bar for the media device can be configured with a thickness to enable interaction with the seek bar, such as a thickness of 5 pixels, and the starting point 311 can be at the top center of the user interface.

In accordance with an embodiment, the display element configuration component can generate a seek bar corresponding to the round shape and linear inset portion or chin of the parent user interface, by generating a plurality of sections of the seek bar. For example, the display element configuration component can determine, based on the parent user interface data, that the parent user interface includes an arcuate (rounded) section and a linear (chin) section. The display element configuration component can also determine an arc length corresponding to the arcuate section, and a length of the linear section.

In accordance with an embodiment, the display element configuration component generates a first section of the seek bar, which originates at the starting point. For example, where the starting point is at a top center of the parent user interface, the display element configuration component can generate a first section having an arc length corresponding to a distance between the starting point and a transition point 359 where the arcuate section meets the linear section. The first section can have a location corresponding to the right-hand side of the arcuate section.

In accordance with an embodiment, the display element configuration component can also generate a second section of the seek bar, having a length corresponding to the chin width of the linear inset portion or chin of the parent user interface, and a location corresponding to the location of the chin of the parent user interface.

In accordance with an embodiment, the parent user interface data can include, or be used to determine, the dimensions of the linear inset portion or chin of a semi-round parent user interface.

For example, in accordance with an embodiment, the display element configuration component can determine the height of the linear inset portion or chin based on the difference in value between the parent user interface height (interface_height) and parent user interface width (interface_width), as chin_height=|interface_width−interface_height|; and can further determine the width of the linear inset portion or chin, as chin_width=$2\sqrt{(chin\_height \times interface\_width - chin\_height^2)}$.

In accordance with an embodiment, the display element configuration component can generate a third section of the seek bar, having a length corresponding to an arc length between a second transition point and an ending point of the seek bar, and a location corresponding to a left-hand side of the arcuate section of the parent user interface.

Accordingly, in accordance with an embodiment, the plurality of sections that comprise the composite seek bar can be displayed together as a display element, such that the seek bar appears to follow the perimeter of the semi-round screen or user interface in a contiguous manner, wherein the length of the seek bar follows the curvature of the semi-round screen or user interface, including in this example accommodating the linear inset portion or chin of the user interface.

The above approach to determine the dimensions of a linear inset portion or chin is described by way of example. In accordance with other embodiments, other approaches, including other forms of measurements and calculations can be used, to accommodate semi-round or other shapes of display screens and parent user interfaces.

Figures 10A, 10B:
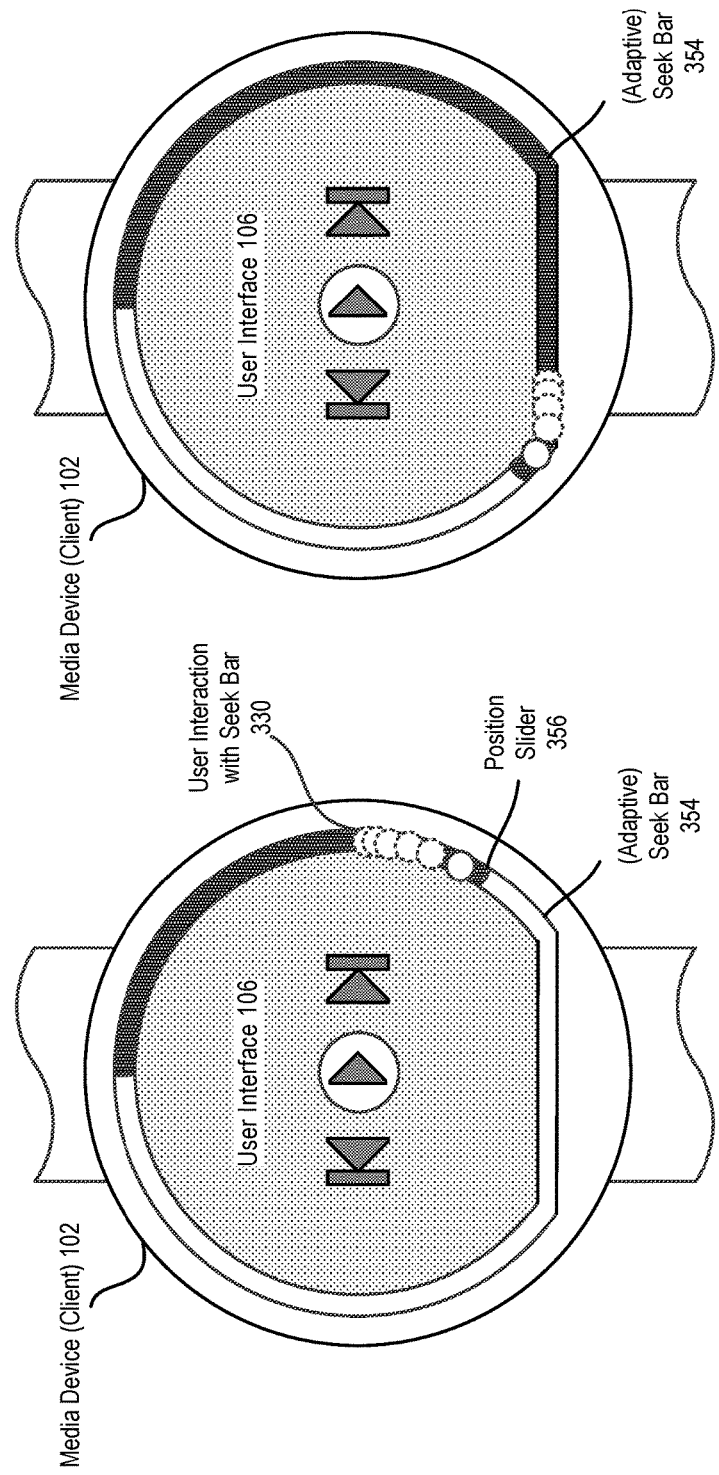
FIG. 10A and FIG. 10B illustrate the use of an adaptive seek bar with an electronic device having a semi-round user interface, in accordance with an embodiment.

FIG. 10A and FIG. 10B illustrate the use of an adaptive seek bar with an electronic device having a semi-round user interface, in accordance with an embodiment. As illustrated in FIGS. 10A and 10B, a user can interact with the seek bar at the user interface, so that the user interaction with the seek bar can be used to access or otherwise control the playing of media content that is stored locally at the electronic device, or is streamed from a media server.

Although in the above figures, various example seek bars are displayed as traversing a clockwise direction from the starting point, embodiments are not limited thereto, and a seek bar can be displayed as traversing in a counterclockwise direction from the starting point.

In accordance with an embodiment, a starting point of the seek bar can be at the top center point of the display screen. However, embodiments are not limited thereto, and the starting point may be at another location on the display screen. In accordance with an embodiment, a length of a seek bar can extend along the entire perimeter of a display screen, or along only a section of the perimeter of the display screen.

In accordance with an embodiment, the display element configuration component can request and receive media content data (or media content metadata) from the media server. In accordance with an embodiment, the media content data includes data corresponding to the duration of a particular media content item (e.g., a song) being played or to be played at the media device. However, embodiments are not limited thereto, and other information about a particular media content item (e.g., metadata), can be received by the display element configuration component, from the media server, and utilized to configure a display element.

For example, in accordance with an embodiment, the display element configuration component can be configured to receive a mood or genre associated with a particular media content item, and can configure visual characteristics of the seek bar, such as a color or brightness, in accordance with the received information.

Figure 11:
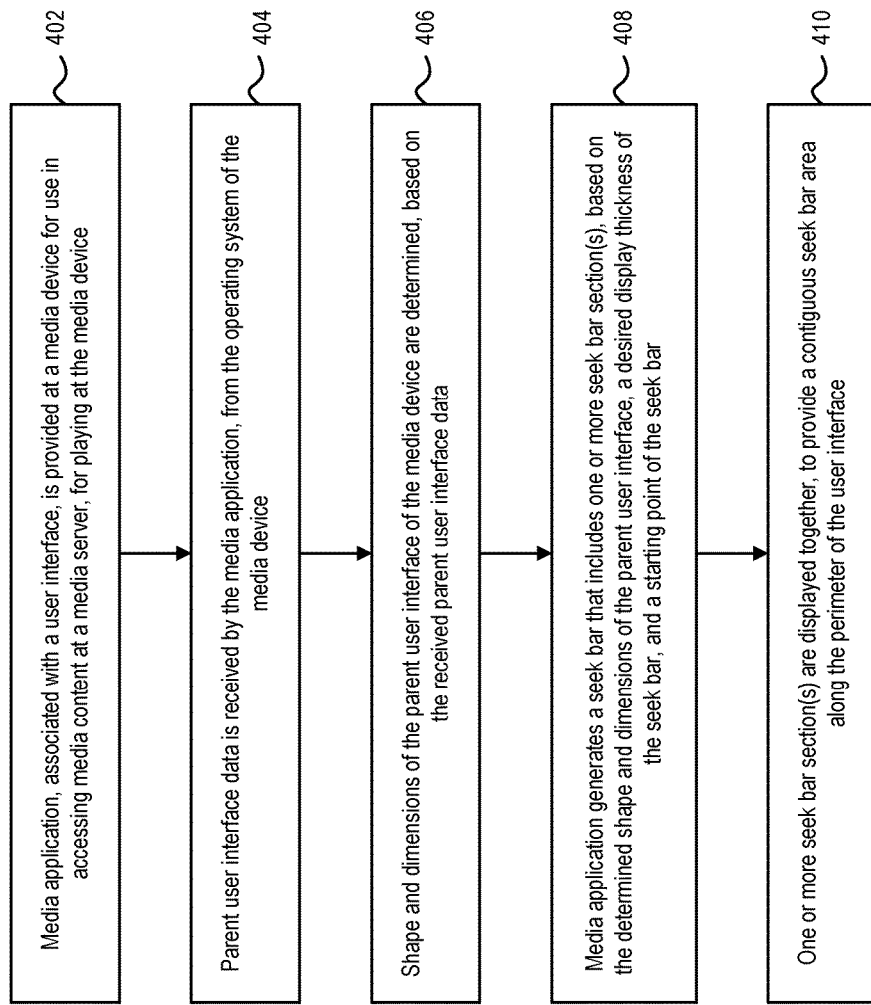
FIG. 11 illustrates a method for providing an adaptive seek bar, in accordance with an embodiment.

FIG. 11 illustrates a method for providing an adaptive seek bar, in accordance with an embodiment.

As illustrated in FIG. 11, in accordance with an embodiment, at operation 402, a media application, associated with a user interface, is provided at a media device for use in accessing media content at a media server, for playing at the media device.

At operation 404, a parent user interface data is received by the media application, from the operating system of the media device.

At operation 406, the shape and dimensions of the parent user interface of the media device are determined, based on the received parent user interface data.

At operation 408, the media application generates a seek bar that includes one or more seek bar section(s), based on the determined shape and dimensions of the parent user interface, a desired display thickness of the seek bar, and a starting point of the seek bar.

At operation 410, the one or more seek bar section(s) are displayed together, to provide a contiguous seek bar area along the perimeter of the user interface.

Figure 12:
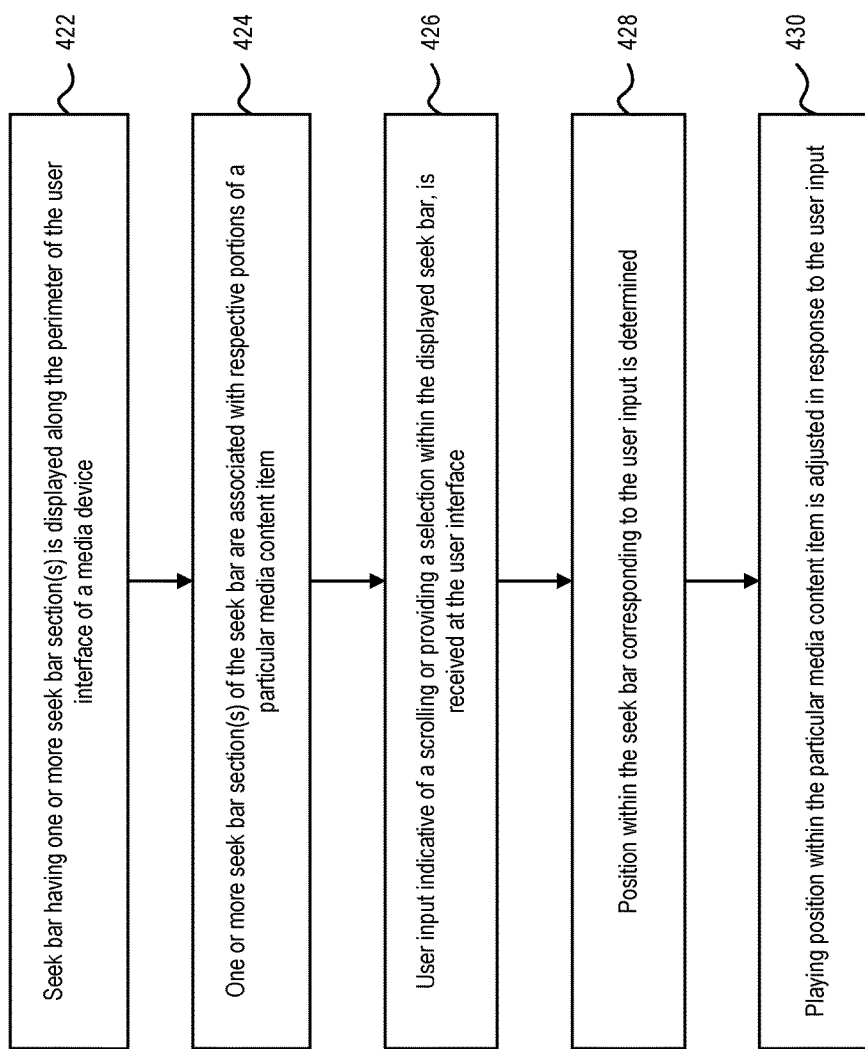
FIG. 12 further illustrates a method for providing an adaptive seek bar, in accordance with an embodiment.

FIG. 12 further illustrates a method for providing an adaptive seek bar, in accordance with an embodiment.

As illustrated in FIG. 12, in accordance with an embodiment, at operation 422, a seek bar having one or more seek bar section(s) is displayed along the perimeter of the user interface of a media device.

At operation 424, the one or more seek bar section(s) of the seek bar are associated with respective portions of a particular media content item.

At operation 426, a user input indicative of a scrolling or providing a selection within the displayed seek bar, is received at the user interface.

At operation 428, a position within the seek bar corresponding to the user input is determined.

At operation 430, a playing position within the particular media content item is adjusted in response to the user input.

Embodiments can be conveniently implemented using one or more conventional general purpose or specialized digital computers, computing devices, machines, or microprocessors, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory computer readable storage medium (media) having instructions stored thereon/in which can be used to program a computer to perform any of the processes of the present invention. Examples of storage mediums can include, but are not limited to, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or other types of storage media or devices suitable for non-transitory storage of instructions and/or data.

The foregoing description of embodiments has been provided for the purposes of illustration and description. It is not intended to be exhaustive or to limit the invention to the precise forms disclosed. Many modifications and variations will be apparent to the practitioner skilled in the art.

For example, while the techniques described above generally illustrate examples such as a music streaming service such as Spotify, and streamed music or song content, the systems and techniques described herein can be similarly used with other types of media content environments, and other types of streamed data or media content; or with locally-stored media content, for example media content that is stored and accessed locally at the electronic or media device.

In addition, while embodiments describe providing a seek bar adjusting a current playback position/location within a particular media content item or stream of media content, embodiments can be generally applied to providing a progress bar or other display elements or other control elements, e.g., volume control, sound characteristics, bass, etc., to manipulate some aspect of the system or the media content being played.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. An electronic device that includes an adaptive seek bar, the electronic device comprising:
    one or more computer processors, including a media application executing thereon which is configured to access media content at a media server, for playing at the electronic device; and
    a memory storing instructions for use by the media application which, when executed, cause the media application at the electronic device to:
        receive, from an operating system of the electronic device, a parent user interface data indicating a shape and dimensions of a parent user interface, wherein the parent user interface corresponds to the entirety of a display screen of the electronic device;
        determine, based on the parent user interface data, a perimeter of the parent user interface;
        generate and display a seek bar along the perimeter of the parent user interface, including generating a plurality of sections of the seek bar selected from linear sections and arcuate sections, based on the received parent user interface data and determination of its perimeter, to cause display of the seek bar to adaptively conform to the perimeter of the parent user interface;
        wherein the plurality of sections of the seek bar conforming to the perimeter of the parent user interface and selected from linear sections and arcuate sections are associated with respective portions of a media content item that is accessible at the media server; and
        control playing of the media content item using interaction with the adaptive seek bar.

2. The system of claim 1, wherein the parent user interface corresponds to sides of a rectangle.

3. The system of claim 1, wherein the parent user interface corresponds to a round shape.

4. The system of claim 1, wherein the parent user interface comprises a arcuate section and a linear section.

5. The system of claim 1, wherein the parent user interface data indicates dimensions of the parent user interface, and wherein generating the seek bar further comprises:
    determining a starting point and a total length of the seek bar to be displayed at the parent user interface, and
    generating the one or more sections of the seek bar so that the total length of the seek bar is apportioned among particular sections, in accordance with the dimensions of the parent user interface.

6. The system of claim 1, wherein the instructions, when executed, further cause the electronic device to receive, at the parent user interface, a user input indicative of movement from a first position on the seek bar to a second position on the seek bar.

7. The system of claim 6, wherein the first position and the second position are within a same section of the seek bar.

8. The system of claim 6, wherein the first position and the second position are within different sections of the seek bar.

9. The system of claim 6, wherein the instructions, when executed, further cause the electronic device to adjust playback of the media content item to a playback position corresponding to the second position.

10. A method for providing an adaptive seek bar at an electronic device, the method comprising:
    providing, at the electronic device including one or more computer processors, a media application executing thereon which is configured to access media content at a media server, for playing at the electronic device;
    receiving, from an operating system of the electronic device, a parent user interface data indicating a shape and dimensions of a parent user interface, wherein the parent user interface corresponds to the entirety of a display screen of the electronic device;
    determining, based on the parent user interface data, a perimeter of the parent user interface;
    generating and displaying a seek bar along the perimeter of the parent user interface, including generating a plurality of sections of the seek bar selected from linear sections and arcuate sections, based on the received parent user interface data and determination of its perimeter, to cause display of the seek bar to adaptively conform to the perimeter of the parent user interface;
    wherein the plurality of sections of the seek bar conforming to the perimeter of the parent user interface and selected from linear sections and arcuate sections are associated with respective portions of a media content item that is accessible at the media server; and
    controlling playing of the media content item using interaction with the adaptive seek bar.

11. The method of claim 10, wherein the parent user interface corresponds to sides of a rectangle.

12. The method of claim 10, wherein the parent user interface corresponds to a round shape.

13. The method of claim 10, wherein the parent user interface comprises a arcuate section and a linear section.

14. The method of claim 10, wherein the parent user interface data indicates dimensions of the parent user interface, and wherein generating the seek bar further comprises:
    determining a starting point and a total length of the seek bar to be displayed at the parent user interface, and
    generating the one or more sections of the seek bar so that the total length of the seek bar is apportioned among particular sections, in accordance with the dimensions of the parent user interface.

15. The method of claim 10, further comprising receiving, at the parent user interface, a user input indicative of movement from a first position on the seek bar to a second position on the seek bar.

16. The method of claim 15, wherein the first position and the second position are within a same section of the seek bar.

17. The method of claim 15, wherein the first position and the second position are within different sections of the seek bar.

18. The method of claim 15, wherein the electronic device adjusts playback of the media content item to a playback position corresponding to the second position.

19. A non-transitory computer readable storage medium, including instructions stored thereon which, when read and executed an electronic device including one or more computer processors, cause the electronic device to perform a method comprising:

providing, at the electronic device, a media application executing thereon which is configured to access media content at a media server, for playing at the electronic device;

receiving, from an operating system of the electronic device, a parent user interface data indicating a shape and dimensions of a parent user interface, wherein the parent user interface corresponds to the entirety of a display screen of the electronic device;

determining, based on the parent user interface data, a perimeter of the parent user interface;

generating and displaying a seek bar along the perimeter of the parent user interface, including generating a plurality of sections of the seek bar selected from linear sections and arcuate sections, based on the received parent user interface data and determination of its perimeter, to cause display of the seek bar to adaptively conform to the perimeter of the parent user interface;

wherein the plurality of sections of the seek bar conforming to the perimeter of the parent user interface and selected from linear sections and arcuate sections are associated with respective portions of a media content item that is accessible at the media server; and controlling playing of the media content item using interaction with the adaptive seek bar.

20. The non-transitory computer readable storage medium of claim 19, wherein the parent user interface data indicates dimensions of the parent user interface, and wherein generating the seek bar further comprises:

determining a starting point and a total length of the seek bar to be displayed at the parent user interface, and generating the one or more sections of the seek bar so that the total length of the seek bar is apportioned among particular sections, in accordance with the dimensions of the parent user interface.

* * * * *